(12) United States Patent
Barletta et al.

(10) Patent No.: US 7,929,844 B2
(45) Date of Patent: Apr. 19, 2011

(54) VIDEO SIGNAL PLAYBACK APPARATUS AND METHOD

(75) Inventors: Antonio Barletta, Stuttgart (DE); Matthias Mayer, Stuttgart (DE); Boris Moser, Walheim (DE)

(73) Assignee: Sony Deutschland GmbH, Cologne (DE)

( * ) Notice: Subject to any disclaimer, the term of this patent is extended or adjusted under 35 U.S.C. 154(b) by 1002 days.

(21) Appl. No.: 10/988,241

(22) Filed: Nov. 12, 2004

(65) Prior Publication Data

US 2005/0108765 A1 May 19, 2005

(30) Foreign Application Priority Data

Nov. 14, 2003 (EP) .................................. 03026252

(51) Int. Cl.
*H04N 5/783* (2006.01)
*H04N 5/93* (2006.01)

(52) U.S. Cl. ........ 386/350; 386/343; 386/344; 386/345; 386/353

(58) Field of Classification Search ................ 386/1, 46, 386/52–55, 112, 124–126, 68, 83, 95; 725/37, 725/88–90
See application file for complete search history.

(56) References Cited

U.S. PATENT DOCUMENTS

| | | | | |
|---|---|---|---|---|
| 6,009,234 A | * | 12/1999 | Taira et al. | 386/95 |
| 6,766,098 B1 | * | 7/2004 | McGee et al. | 386/46 |
| 7,046,911 B2 | * | 5/2006 | Zimmerman et al. | 386/68 |
| 7,313,808 B1 | * | 12/2007 | Gupta et al. | 725/89 |
| 2002/0039485 A1 | * | 4/2002 | Fujita et al. | 386/125 |
| 2002/0076209 A1 | * | 6/2002 | Moon | 386/98 |

FOREIGN PATENT DOCUMENTS

EP 1 182 584 2/2002

OTHER PUBLICATIONS

Christel M G et al: "Evolving Video Skims Into Useful Multimedia Abstractions" CHI '98. Human Factors in Computing Systems. Conference Proceedings. Los Angeles, CA, Apr. 18-23, 1998, CHI Conference Proceedings. Human Factors in Computing Systems New York, NY : ACM, US, Apr. 18, 1998, pp. 171-178, XP000780789. IBM Almaden Research Center, Berkeley Multimedia, Interfaces, and Graphics Seminar, Apr. 2000.

(Continued)

*Primary Examiner* — Peter-Anthony Pappas
*Assistant Examiner* — Marc Dazenski
(74) *Attorney, Agent, or Firm* — Oblon, Spivak, McClelland, Maier & Neustadt, L.L.P.

(57) ABSTRACT

The present patent application relates to a video signal playback apparatus comprising video signal chunking means for partitioning a video signal provided to the video signal playback apparatus into video chunks, each video chunk comprising a first temporal amount of video signals, and video chunk compressing means for temporarily compressing the first temporal amount of video signals comprised in each video chunk. According to the present invention the video chunk compressing means temporarily compresses the first temporal amount of video signals comprised in each video chunk by automatically generating a key video sequence for each video chunk by using the video signals comprised in the respective video chunk, each key video sequence comprising a second temporal amount of video signals which is less than the first temporal amount of video signals, wherein the video signal playback apparatus further comprises key video sequence playback means for playing back said key video sequences generated by the video chunk compressing means.

5 Claims, 7 Drawing Sheets

OTHER PUBLICATIONS

Michael G. Christel, Alexander G. Hauptmann, Adrienne S. Warmack, Scott A. Crosby. Adjustable Filmstrips and Skims as Abstractions for a Digital Video Library. IEEE Advances in Digital Libraries Conference, Baltimore, MD., May 19-21, 1999.

Gary Geisler, Gary Marchionini, Barara M. Wildemuth, Anthony Hughes, Meng Yang, Todd Wilkens, and Richard Spinks. Video Browsing Interfaces for the Open Video Project, p. 514-515.

* cited by examiner

VIDEO SIGNAL PLAYBACK APPARATUS AND METHOD

BACKGROUND OF THE INVENTION

1. Field of the Invention

The present invention relates to a video signal playback apparatus and method.

There is a growing amount of video signals available on the Internet and on a variety of storage media e.g. VHS cassettes or DVD (digital video discs). Furthermore, said video signals are provided by a huge number of telestations as an analog or digital video signal.

In general, a video signal is a rich multimodal information source containing speech, audio, text, colour patterns and shape of imaged objects and motion of these objects.

In the present document, a self-contained video signal belonging to one general subject matter is referred to as "video film". For example, each single feature film and each single documentary film is referred to as video film.

Usually, each video film contains a plurality of self-contained activities (events). In this regard, only self-contained activities (events) having a certain minimum importance are accounted for. If the video film is a certain feature film, for example, said self-contained activities might be the different scenes of the feature film.

In the following, said self-contained activities (events) which are included in a certain video film and meet a minimum importance are called "contents".

Said contents frequently comprise a "key event" which characterises the whole content. If a content of a feature film comprises a rendezvous of two persons, for example, the key event of said content will be the moment the persons actually meet and not the separate ways the persons might have to take to go to the location the rendezvous takes place.

Beginning from the time a video signal (comprising e.g. a movie) firstly was stored into a recording medium, there has been an increasing desire to decide whether a certain video signal stored in a recording medium contains interesting contents.

2. Discussion of the Background

There have been proposed several solutions that intend to support the user in taking this kind of decision:

Firstly, "trailers" are provided for a plurality of video films. Each trailer is a manually prepared summary of the contents of the respective video film. Normally, the trailer is produced by the provider or producer of the respective video film.

Since trailers are an advertisement with the intention to attract consumers, trailers are not neutral and therefore do not reliably indicate whether a certain video film contains interesting contents or not. Furthermore, trailers have to be produced manually which is very costly and cumbersomely. Therefore, there is not available a trailer for every video signal.

Secondly, a key frame based solution is disclosed by Michael G. CHRISTEL et al. in the paper "Adjustable Filmstrips and Skims as Abstractions for a Digital Video Library" which was issued during the IEEE Advances in Digital Libraries Conference, Baltimore, Md., May 19-21, 1999.

In general, key frame based tools communicate information about every content in a video film by displaying a plurality of key frames. Said key frames are individual frames of the respective video film that represent contents like scenes or shots. Said key frames might be displayed as a slide show or a story board (which is also called "film strip").

It is a disadvantage with key frame based tools that they map the dynamic and dramaturgy of information comprised in a video signal to still pictures and thus in a static form. This comprises a high risk of loosing important information comprised in the respective video signal. If the key frame is showing the face of a person, for example, it can not be distinguished whether the person is just sitting around or involved in an important activity.

Thirdly, to solve the before mentioned problem, an automatic production of video skims that preserve the video's frame rate is additionally proposed by the above paper "Adjustable Filmstrips and Skims as Abstractions for a Digital Video Library". A video skim is an portion of cohesive video signals which is extracted from the original video signals.

With video skims it is a disadvantage that each video film/video film clip is characterised by only one video skim. Thus, although video skims are a dynamic form of displaying information, there is still a high risk of loosing important information comprised in the original video signal. Furthermore, those parts of the video information comprised in the video signal that are selected for the video skim are played back in the original frame rate. Since the video skims need to have a certain minimum size relative to the size of the original video signal to avoid an excessive loss of information, the time required to view the video skim characterising the information comprised in a video signal still is very high. In consequence the potential compression rate of the video signal is relatively low.

Fourthly, the traditional video tape recorder Fast-Forward and/or Fast-Backward playback mode is frequently used to decide whether a certain video signal contains interesting contents or not.

In the Fast-Forward and/or Fast-Backward playback mode a video signal is played back in a higher frame rate that the frame rate for real time playback (normally 2-, 4-, or 8-times as fast as the original frame rate) in order to go quickly through the video signal and to preserve the dynamic flow of a story comprised in the video signal.

Figure 11:
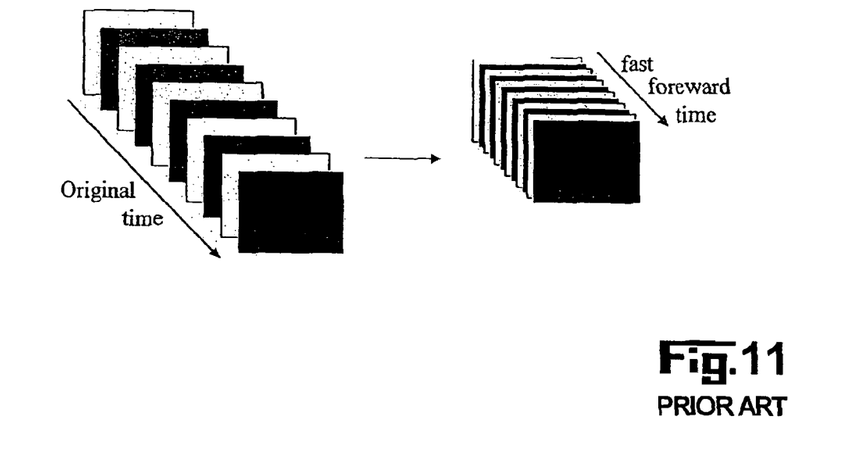
FIGS. 11, 12 schematically illustrate video tape recorder Fast-Forward and/or Fast-Backward playback modes according to the prior art.
Figure 12:
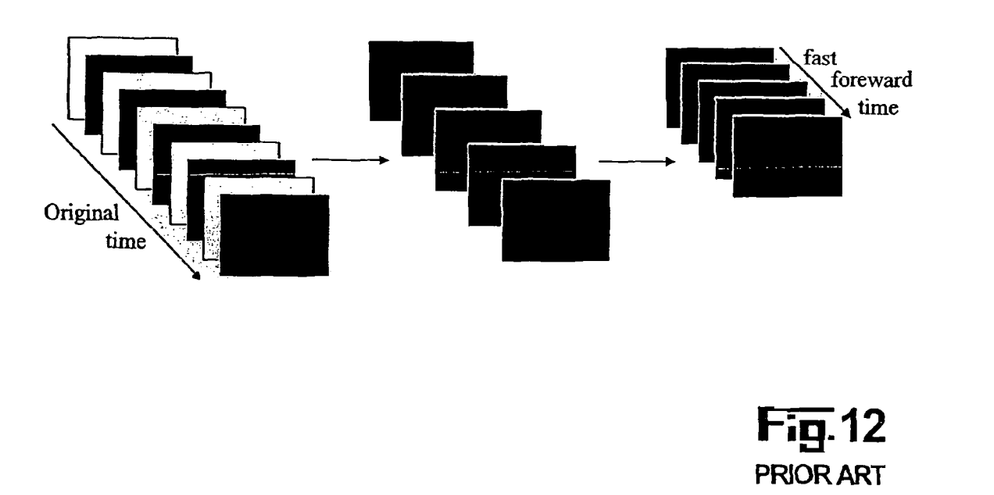

By reference to FIGS. 11 and 12 the traditional Fast-Forward and/or Fast-Backward playback mode is shortly discussed:

This technique was developed in analogue-type video tape recorders and conventionally is realised by scanning the video tape in a speed faster than normal speed as it is shown in FIG. 11. Thus, the rate of displayed information is raised. Applied to the digital world of modern digital video recorders this means that the frame rate is increased.

Alternatively, the chronological distance between two successive frames of a video signal might be increased while the rate of displayed information stays constant. In other words, frames (e.g. every n-th frame) are skipped by keeping the original frame rate as it is shown in FIG. 12.

In FIGS. 11, 12 succeeding frames of a video information comprised in a video signal are marked by different colours. In both figures, the frames of the original video signal played back in real time are shown on the left side of the respective figure whereas the information displayed in the Fast-Forward and/or Fast-Backward playback mode is shown on the right side of the respective figure.

It is a disadvantage, that this prior art method is very time consuming. For a fast playback of a typical movie comprising 100 minutes of video information in 8-times real time, for example, about 12.5 minutes are required to scan the video information comprised in the video signal.

This time can not be further reduced since there is a natural limit for the increased frame rate caused by the limited capability of humans:

If the frame rate is continuously increased, there is a maximum frame rate where the change of pictures of information comprised in a video signal becomes too fast for a human watching said video signal. Although this maximum frame rate differs for each individual person, such a maximum frame rate exists for everybody. It is assumed that said maximum frame rate is arround 32-times real time. Thus, the minimum amount of time which is theoretically necessary to scan the information comprised in a temporal amount of 100 minutes of video signals by playing back said video signal in 32-times real time is 3,125 minutes.

This necessarily results in a minimum amount of time that is needed to preview a video signal by using the traditional video tape recorder Fast-Forward and/or Fast-Backward playback mode.

Fifthly, a fast video play back mode is provided by the "Cue video" system of the International Business Machines Corporation. This fast video play back mode is composed of shots from the original video that are played back in different speeds depending on an activity (and especially motion) comprised in each shot.

It is a disadvantage with the "Clue video" system that all parts of a video signal are played back and thus the overall compression rate is limited. Therefore, a significant amount of time still is necessary to visually scan the information comprised in the video signal. In addition, complex analysis techniques are needed to detect motion in the information comprised in the video signal.

Sixthly, video signals stored to digital video discs frequently comprise chapters which have been added to the video signals during the production of the digital video disc to allow navigation through the video signals comprised in the disc. Said chapters normally allow identification of the story line and thus of the information comprised in the respective video signal, only. Especially, said chapters do not allow identification of individual contents (self-contained activities/events having a certain minimum importance) comprised in the video film different from the predefined chapters. Furthermore, said chapters are not neutral since they are provided by a provider or producer of the digital video disc.

The problem of the above prior art concepts is that a visual scan through video information comprised in a video signal either still requires a lot of time or that they are not neutral and therefore do not reliably indicate whether a certain video signal contains interesting contents.

SUMMARY OF THE INVENTION

It is the object of the present invention to overcome the above cited disadvantages and to provide a video signal playback apparatus and method which further reduces the amount of time necessary to visually scan through video information comprised in a video signal without overstraining the physical capabilities of a user.

According to the present invention a video signal playback apparatus comprises video signal chunking means for partitioning a video signal provided to the video signal playback apparatus into video chunks, each video chunk comprising a first temporal amount of video signals, and video chunk compressing means for temporarily compressing the first temporal amount of video signals comprised in each video chunk, wherein the video chunk compressing means temporarily compresses the first temporal amount of video signals comprised in each video chunk by automatically generating a key video sequence for each video chunk by using the video signals comprised in the respective video chunk, each key video sequence comprising a second temporal amount of video signals which is less than the first temporal amount of video signals. Furthermore, the video signal playback apparatus comprises key video sequence playback means for playing back said key video sequences generated by the video chunk compressing means.

By automatically generating a key video sequence for each video chunk and playing back the generated key video sequences, the amount of time necessary to visually scan video information comprised in a video signal is significantly reduced. The reason is that the temporal amount of time comprised in each key video sequence is less than the temporal amount of time comprised in the respective video chunk.

Since the total amount of video signals to be displayed during scanning of the video signal is significantly reduced, the frame rate used for displaying the key video sequences can be maintained in a range comfortable for visual control by a user. Therefore, it is guaranteed that the physical capabilities of a user with respect to understanding displayed information are not overstrained.

Furthermore, since a key video sequence is generated for each video chunk based on the video signals comprised in the respective video chunk, and the key video sequence is a dynamic form of information (in contrast to a still picture), the loss of information during scanning of the video signal is kept small.

Advantageously, the key video sequences generated by the video chunk compressing means are played back by the key video sequence playback means in real time.

Visual information which is played back in real time easily can be understood by a user with high comfort since both audio and visual information can be used.

Alternatively, it is beneficial if the key video sequences generated by the video chunk compressing means are played back by the key video sequence playback means in a time shorter than real time.

Thus, the amount of time necessary to visually scan through the information comprised in the video signal can be further reduced significantly by using a common technology.

Even during play back of the key video sequences in a time shorter than real time an overstraining of physical capabilities of a user reliably can be avoided since the key video sequences have a certain minimum duration (depending on the second temporal amount of video signals comprised in each key video sequence). Furthermore, an increased frame rate (preferably 2-times or 3-times or 4-times or 5-times or 6-times or 7-times or 8-times real time) corresponding to conventional fast play back can be used. User are familiar with understanding video information played back with such frame rate.

Favourably, the first temporal amount of video signals comprised in each video chunk is constant.

If the first temporal amount of video signal comprised in each video chunk is constant, the video signal can be divided into equal video chunks by the video signal chunking means without performing a complex calculation.

Favourably, the first temporal amount of video signals comprised in each video chunk is varied by the video signal chunking means depending on the rate of temporal compression achieved by the video chunk compressing means to keep the second temporal amount of video signals comprised in each key video sequence constant.

Thus, it is guaranteed that the temporal amount of video signals comprised in each key video sequence is sufficient for a user to understand the information comprised in the respective video chunk. Said optimal amount might be received for a typical user by empiric studies or be chosen individually for each user.

Furthermore, the temporal amount of video signals comprised in each key video sequence can be kept constant irrespective to a respective compression rate of the video chunk compressing means.

According to a preferred embodiment of the present invention, the video signal chunking means comprises content detection means for automatically detecting contents comprised in the video signal provided to the video signal playback apparatus, wherein the first temporal amount of video signals comprised in each video chunk is varied depending on the amount of video signals belonging to the respective contents detected by the content detection means.

By the provision of content detection means the temporal amount of video signals comprised in each video chunk can be individually adapted to the contents comprised in the respective video signal. Thus, it can be guaranteed that each content comprised in the video signal is identified by a video chunk and a corresponding key video sequence.

It is preferred that the video chunk compressing means automatically generates a key video sequence for each video chunk by choosing a section of the video signals comprised in the respective video chunk.

Preferably, the video chunk compressing means automatically chooses a predetermined amount of cohesive video signals in the beginning or the middle or the end of the video signals comprised in each video chunk to generate a key video sequence for the respective video chunk.

Therefore, a suitable key video for a respective video chunk can be generated without performing a complex calculation.

As an alternative it is preferred, that the video chunk compressing means comprises key event detection means for automatically detecting a key event in the respective video signal comprised in each video chunk, wherein the video chunk compressing means automatically chooses a predetermined temporal amount of cohesive video signals comprising the respective key event to generate a key video sequence for the respective video chunk.

By the provision of key event detection means it is guaranteed that a key video sequence for a respective video chunk comprises a corresponding key event and thus correctly identifies the information comprised in the video signals of the respective video chunk.

Preferably, the key video sequence playback means further is adapted to play back the video signals provided to the video signal playback apparatus in real time and/or to play back the video signals provided to the video signal playback apparatus backwards and/or forwards in a time shorter than real time.

Thus, the video signal playback means of a conventional video signal recording/reproducing apparatus can be used as key video sequence playback means. Therefore, the inventive video signal playback apparatus can be produced with moderate costs.

Moreover, it is profitable if the video signal playback apparatus further comprises a user interface for allowing a manual control of a play back operation performed by the key video sequence playback means.

It is beneficial, if said user interface allows a manual adjustment of the speed used by the key video sequence playback means for playing back the key video sequences. Preferably, said user interface allows adjustment before and/or during playback operation.

Thus, by using the user interface for each individual user the individual maximum frame rate preferred during play back of video signals can be accounted for.

Furthermore, it is preferred that the user interface additionally allows a manual control of the video signal chunking means by defining the first temporal amount of video signals comprised in each video chunk and/or the video chunk compressing means by defining the second temporal amount of video signals comprised in each key video sequence.

Thus, the user interface further allows a manual adjustment of the video chunk compressing means to vary the second temporal amount of video signals comprised in each key video sequence. In consequence, the basic system parameters of the inventive video signal playback apparatus can be influenced by a user by using the user interface.

Moreover, it is preferred that the user interface further allows manual input of an amount of time envisaged for playing back said key video sequences by said key video sequence playback means and that the video signal playback apparatus further comprises control means to automatically control the first temporal amount of video signals comprised in each video chunk and/or the second temporal amount of video signals comprised in each key video sequence based on the speed used by the key video sequence playback means for playing back the key video sequences in a way that the input amount of time for playing back said key video sequences is met.

In consequence a user can define the amount of time he wants to take to go browse through a video signal. This significantly increases user-friendliness.

Advantageously, the play back of key video sequences automatically is initiated by the key video sequence playback means when the video signals are fast played back in a time shorter than a predetermined fraction of real time.

This significantly enhances the comfort provided by the inventive video signal playback apparatus to a user since the user does not have to decide every time by himself whether his individual maximum frame rate for play back of video signals has already been reached.

In this case, it is beneficial if said fraction of real time is depending on an input by a user.

Furthermore, the above object is solved by a method for playing back a video signal comprising the following steps:

partitioning a video signal into video chunks, each video chunk comprising a first temporal amount of video signals;

temporarily compressing the first temporal amount of video signals comprised in each video chunk by automatically generating a key video sequence for each video chunk by using the video signals comprised in the respective video chunk, each key video sequence comprising a second temporal amount of video signals which is less than the first temporal amount of video signals; and playing back said key video sequences.

It is obvious that the step of temporarily compressing the first temporal amount of video signals comprised in each video chunk by automatically generating a key video sequence for each video chunk and the step of playing back said key video sequences have not necessarily to be performed sequentially, but might be performed simultaneously.

Preferably, said key video sequences are played back in real time.

As an alternative, said key video sequences are played back in a time shorter than real time.

Favourably, the first temporal amount of video signals comprised in each video chunk is constant.

Alternatively, it is beneficial if the first temporal amount of video signals comprised in each video chunk is varied depending on the rate of temporal compression achieved during the step of temporarily compressing the first temporal amount of video signals comprised in each video chunk to keep the second temporal amount of video signals comprised in each key video sequence constant.

Moreover, it is preferred that during the step of partitioning a video signal into video chunks, contents comprised in the video signal automatically are detected, wherein the first temporal amount of video signals comprised in each video chunk is varied depending on the amount of video signals belonging to the respective contents.

According to a preferred embodiment of the present invention, a key video sequence for each video chunk is generated automatically in the step of temporarily compressing the first temporal amount of video signals comprised in each video chunk by choosing a section of the video signals comprised in the respective video chunk.

Favourably, a predetermined amount of cohesive video signals in the beginning or the middle or the end of the video signals comprised in each video chunk is chosen automatically in the step of temporarily compressing the first temporal amount of video signals comprised in each video chunk to generate a key video sequence for the respective video chunk.

Moreover, it is beneficial if in the step of temporarily compressing the first temporal amount of video signals comprised in each video chunk a key event in the respective video signal comprised in each video chunk is detected automatically, wherein a predetermined temporal amount of cohesive video signals comprising the respective key event automatically is chosen to generate a key video sequence for the respective video chunk.

Furthermore, it is preferred that the method further comprises the step of detecting speed of play back of video signals and initiating automatically play back of key video sequences when the video signals are fast played back in a time shorter than a predetermined fraction of real time.

Preferably, the method for playing back a video signal further comprises the step of requesting a user input for allowing a manual control of the step of playing back said key video sequences.

In this respect it is preferred that the step of requesting a user input allows a manual adjustment of the speed used in the step of playing back said key video sequences.

It is profitable if the step of requesting a user input further allows a manual control of the first temporal amount of video signals comprised in each video chunk used in the step of partitioning a video signal into video chunks and/or of the second temporal amount of video signals comprised in each key video sequence used in the step of temporarily compressing the first temporal amount of video signals comprised in each video chunk by automatically generating a key video sequence for each video chunk.

The above object is further solved by a software product comprising a series of state elements which are adapted to be processed by a data processing means of a terminal such, that a method may be executed thereon.

In the following detailed description, the present invention is explained by reference to the accompanying drawings, in which like reference characters refer to like parts throughout the views, wherein:

DESCRIPTION OF THE EMBODIMENTS

Figure 1:
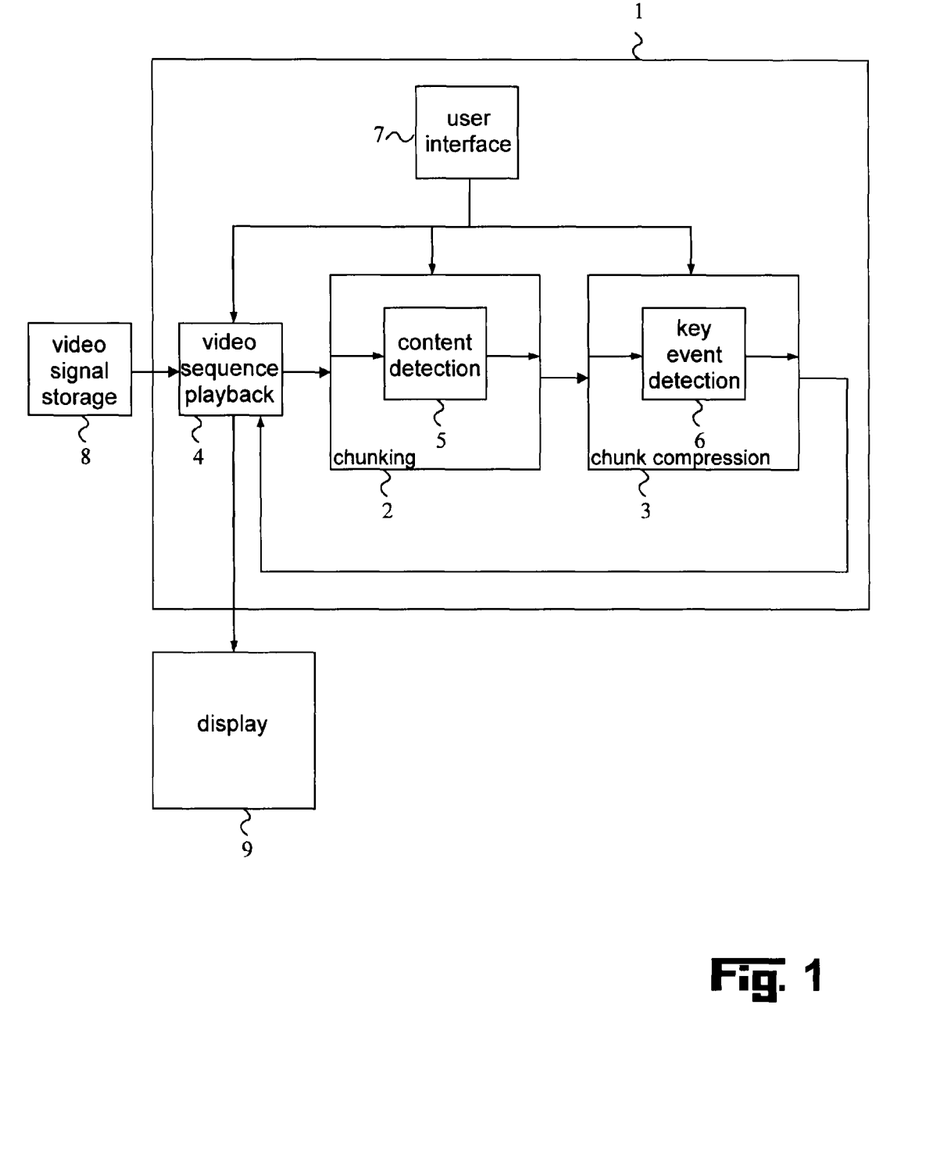
FIG. 1 shows a block diagram of a video signal playback apparatus according to a preferred embodiment of the present invention.
Figure 3:
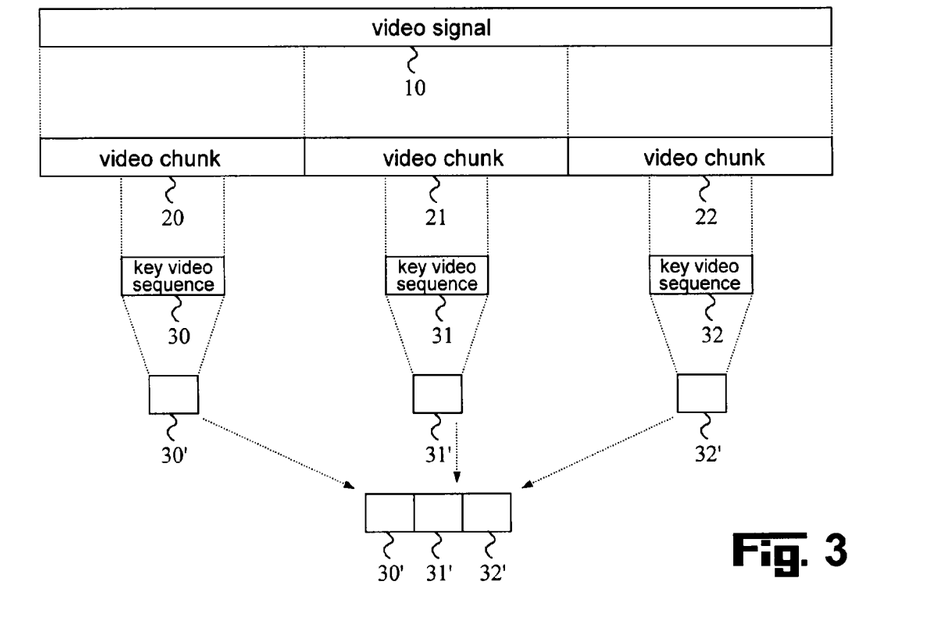
FIG. 3 schematically shows the creation of key video sequences according to a first preferred mode of the video signal chunking means of the inventive video signal playback apparatus.
Figure 4:
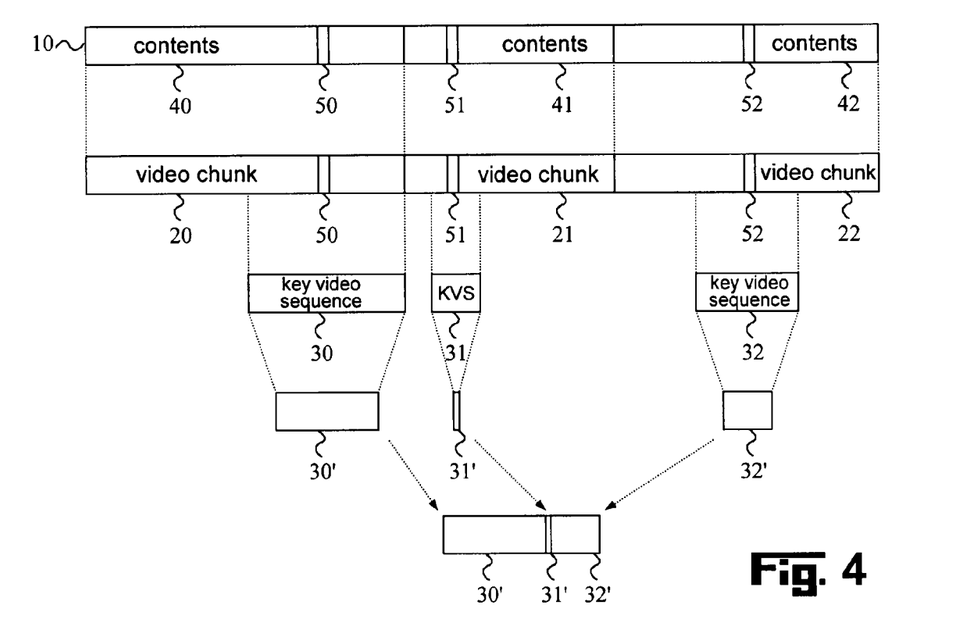
FIG. 4 schematically shows the creation of key video sequences according to a second preferred mode of the video signal chunking means of the inventive video signal playback apparatus.

In the following, the configuration and function of the video signal playback apparatus 1 according to the one preferred embodiment of the present invention is explained. Reference is made to FIGS. 1, 3 and 4.

A (raw) video signal 10 is stored in a video signal storage means 8.

In the present embodiment, said video signal storage means 8 is a conventional digital video disc (DVD) or VHS cassette. Therefore, the video signal storage means 8 shown in FIG. 1 is not part of the inventive video signal playback apparatus 1.

Alternatively, the video signal storage means might be a hard disc comprised in a digital video recorder. In this case (which is not shown in the figures), the video signal storage means is part of the video signal playback apparatus.

The information comprised in the video signal 10 is read out from the video signal storage means 8 by key video sequence playback means 4 and is displayed on a display means 9.

In the present embodiment, said key video sequence playback means 4 is adapted to play back video signals both in real time and in a time shorter than real time (fast play back) both forwards and backwards.

In this respect, play back in real time means that a normal frame rate is used for playing back the information comprised in the video signal. Thus, it takes one second to play back a temporal amount of 1 second of information comprised in the video signal.

Correspondingly, play back in a time shorter than real time means that either frames are skipped or the frame rate is increased as it is shown in FIG. 11, 12, respectively. Thus, it takes less than one second to play back a temporal amount of 1 second of information comprised in the video signal.

In the present embodiment, the key video sequence playback means 4 comprises a conventional magneto-optical read/write head, a buffer memory and a first microcomputer.

The display means 9 is a conventional television. Alternatively, said display means might be a monitor or a video projector, for example.

Furthermore, the video signals 10 are provided by the key video sequence playback means 4 to a video signal chunking means 2 for partitioning said video signal 10 into video chunks 20, 21, 22, wherein each video chunk 20, 21, 22 comprises a first temporal amount of video signals.

In FIGS. 3 and 4 the temporal amount of video signals is symbolised by the horizontal length of the respective element. Thus, it is evident from FIGS. 3 and 4 that the first temporal amount of video signals comprised in each video chunk 20, 21, 22 is a subset of the whole temporal amount of video signals 10.

In the present embodiment, the video signal chunking means 2 is a second microcomputer further comprising an implemented content detection means 5 for automatically detecting contents comprised in the video signal 10 provided to the video signal chunking means 2.

Description of the function of the content detection means 5 is postponed to a later paragraph.

The video chunks 20, 21, 22 generated by the video signal chunking means 2 are provided to video chunk compressing means 3 for temporally compressing the first temporal amount of video signals comprised in each video chunk 20, 21, 22.

Said compressing is performed by automatically generating a key video sequence 30, 31, 32 for each video chunk 20, 21, 22 by using the video signals comprised in the respective video chunk 20, 21, 22.

As it is shown in FIGS. 3, 4 said key video sequences 30, 31, 32 each comprises a second temporal amount of video signals which is less than the first temporal amount of video signals comprised in the video chunks 20, 21, 22.

In the embodiment shown in FIG. 1, the video chunk compressing means 3 is a third microcomputer further comprising an implemented key event detection means 6 for automatically detecting a key event 50, 51, 52 in the respective video signal comprised in each video chunk 20, 21, 22.

Description of the function of the key event detection means 6 is postponed to a later paragraph.

The key video sequences 30, 31, 32 generated by the video chunk compressing means 3 are supplied to the key video sequence playback means 4. The key video sequence playback means 4 plays back said key video sequences 30, 31, 32 by using the display means 9. It has to be emphasised that play back of said key video sequences 30, 31, 32 is performed in one block without any gaps between said key video sequences 30, 31, 32.

In this respect, it has to be emphasised that the key video sequences 30, 31, 32 generated by the video chunk compressing means 3 can be played back by the key video sequence playback means 4 either in real time or in a time shorter than real time.

Visual information which is played back in real time easily can be understood by a user with high comfort since both audio and visual information comprised in the the key video sequence 30, 31, 32 can be used.

On the other hand, the amount of time necessary to visually scan through the information comprised in the video signal 10 can be further reduced significantly by playing back by the key video sequences 30, 31, 32 in a time shorter than real time. Preferably, a frame rate corresponding to conventional fast play back (2-times or 3-times or 4-times or 5-times or 6-times or 7-times or 8-times real time) is used for fast play back said key video sequences 30, 31, 32, since users are familiar with understanding video information played back with such a frame rate.

Play back of key video sequences 30, 31, 32 in a time shorter than real time usually does not overstrain physical capabilities of a user, since the key video sequences 30, 31, 32 have a certain minimum duration (depending on the second temporal amount of video signals comprised in each key video sequence 30, 31, 32).

In the embodiment shown in FIGS. 3 and 4, the key video sequences 30, 31 32 are played back by the key video sequence playback means 4 in a time shorter than real time resulting in compressed key video sequences 30', 31', 32'.

By automatically generating a key video sequence 30, 31, 32 for each video chunk 20, 21, 22 and playing back said key video sequences 30, 31 32 by using the key sequence playback means 4, the amount of time necessary to visually scan through video information comprised in the video signal 10 is significantly reduced since the temporal amount of time comprised in each key video sequence 30, 31, 32 is less than the temporal amount of time comprised in the respective video chunk 20, 21, 22.

As the amount of video signals to be displayed during scanning of the video signal 10 is significantly reduced, the frame rate can be maintained constant. Therefore, it is guaranteed that the physical capabilities of a user of understanding displayed information are not overstrained.

Furthermore, since a key video sequence 30, 31, 32 is generated for each video chunk 20, 21, 22 based on the video signals comprised in the respective video chunk 20, 21, 22, and the key video sequence 30, 31, 32 is a dynamic form of information (in contrast to a still picture), the loss of information during scanning of the video signal 10 is kept moderate.

In the preferred embodiment shown in FIG. 1, the video signal playback apparatus 1 further comprises a user interface 7 which allows a manual control of a play back operation performed by the key video sequence playback means 4. Preferably, said user interface 7 allows control of a play back operation before and/or during playback operation. In consequence, interactive influence of the play back operation by the user is possible.

Said control is performed by allowing a manual adjustment of the speed used by the key video sequence playback means 4 for play back of the video signals 10 and/or the key video sequences 30, 31, 32.

It has to be emphasised that the user interface 7 does not have to be built in into the inventive video signal playback apparatus 1 in a literal sense (e.g. as a keyboard) but might be provided as a separate element which is connected to said video signal playback apparatus 1 via an infrared interface, for example.

In the following, the function of the video signal chunking means 2 is further explained:

Three separate modes can be performed by the video signal chunking means 2 of the inventive video signal playback apparatus 1 shown in FIG. 1.

In a first mode, the first temporal amount of video signals comprised in each video chunk 20, 21, 22 is kept constant as it is shown in FIG. 3.

Thus, the original video signal 10 is partitioned into cohesive parts comprising an equal amount of video signals, each. A complex calculation to generate said video chunks 20, 21, 22 and provision of a content detection means 5 can be avoided. Therefore, the costs of the inventive video signal playback apparatus can be kept moderate.

In this first mode, it is preferred that the first temporal amount of uncompressed video signals included in the video chunks 20, 21, 22 is between 5 and 15 minutes (a temporal amount of 5 minutes is preferred) and the second temporal amount of video signals included in the key video sequences is between 3 and 30 seconds (a temporal amount of 10 seconds is preferred).

For example, if the whole video signals comprises a temporal amount of 100 minutes, the first temporal amount is 5 minutes, and the second temporal amount is 10 seconds, the amount of time necessary to visually scan the information comprised in the video signal when the key video sequences are played back in real time will be as little as 200 seconds (3.33 minutes). This amount of time can be further reduced if the key video sequences 30, 31, 32 are played back in a time shorter than real time (fast key video sequences 30', 31', 32').

Alternatively, in a second mode the first temporal amount of video signals comprised in each video chunk is varied by the video signal chunking means 2 depending on the rate of temporal compression achieved by the video chunk compression means 3 to keep the second temporal amount of video signals comprised to each key video sequence constant. This second mode is not shown separately in the figures since FIG. 3 mainly applies.

When performing this second mode, it is guaranteed that the temporal amount of video signals comprised in each key video sequence is sufficient for a user to understand the information comprised in the respective video chunk.

Said optimal amount might be received for a typical user by empiric studies or be chosen individually for each user. A temporal amount of between 3 and 30 seconds and preferably 10 seconds of video signals (when played back in real time) is believed to be a good value for said second temporal amount.

Another advantage of this second mode is, that the temporal amount of video signals comprised in each key video sequence can be kept constant irrespective to a respective compression rate of the video chunk compressing means. This results in an enhanced comfort for a user scanning the video signal since successive key video sequences are displayed at a regular interval. Furthermore, the content detection means 5 might be avoided to reduce the costs of the inventive video signal playback apparatus 1.

According to a third (preferred) mode which is shown in FIG. 4, contents 40, 41, 42 comprised in the video signal 10 automatically are detected by the content detection means 5 comprised in the video signal chunking means 2.

Said contents 40, 41, 42 are self-contained activities (events) comprised in the video signal 10. In this regard, only self-contained activities (events) having a certain minimum importance are accounted for. If the video signal 10 comprises a certain feature film, for example, said self-contained activities might be the different scenes of the feature film.

Detection of said contents 40, 41, 42 in the video signal 10 is performed by conventional segmentation techniques which are e.g. described in the following papers:

Different approaches for audio-classification-segmentation with respect to speech, music, silence and gender are disclosed in the paper "Speech/Music/Silence and Gender Detection Algorithm" of Hadi HARB, Liming CHEN and Jean-Yves AULOGE published by the Lab. ICTT Dept. Mathematiques—Informatiques, ECOLE CENTRALE DE LYON. 36, avenue Guy de Collongue B. P. 163, 69131 CULLY Cedex, France.

Further algorithms which generate indices from automatic acoustic segmentation are described in the essay "Acoustic Segmentation for Audio Browsers" by Don KIMBER and Lynn WILCOX. These algorithms use hidden Markov models to segment audio into segments corresponding to different speakers or acoustic classes.

Types of proposed acoustic classes include speech, silence, laughter, non-speech sounds and garbage, wherein garbage is defined as non-speech sound not explicitly modelled by the other class models.

According to the third mode of the video signal chunking means 2, the first temporal amount of video signals comprised in each video chunk 20, 21, 22 is varied depending on an amount of video signals belonging to the respective contents 40, 41, 42 detected by the content detection means 5.

Thus, the temporal amount of video signals comprised in each video chunk 20, 21, 22 is adapted individually to the contents comprised in the respective video signal 10. Therefore, it is guaranteed that a video chunk 20, 21, 22 is allocated to each content 40, 41, 42 comprised in the video signal 10.

In the above first, second and third mode of the video signal chunking means 2 the video chunk compression means 3 automatically generates a key video sequence 30, 31, 32 for each video chunk 20, 21, 22 by choosing a section of the video signals comprised in the respective video chunk 20, 21, 22.

In the following, the function of the video chunk compressing means 3 is further explained in detail:

The video chunk compressing means 3 of the inventive video signal playback apparatus comprises two different modes.

In a first mode, a predetermined amount of cohesive video signals in the beginning or the middle or the end of the video signals comprised in each video chunk 20, 21, 22 automatically is chosen by the video chunk compressing means 3 to generate a key video sequence 30, 31, 32 for the respective video chunk 20, 21, 22.

Therefore, this mode requires only a very small amount of calculation to define the key video sequences 30, 31, 32. Furthermore, key event detection means 6 can be voided. Thus, the costs of the inventive video signal playback apparatus 1 can be kept moderate.

In a second mode, a key event 50, 51, 52 comprised in each video chunk 20, 21, 22 automatically is detected by the key event detection means 6 comprised in the video chunk compressing means 3.

Said automatic detection of key events 50, 51, 52 can be performed by the above mentioned conventional segmentation techniques.

According to this second mode, the video chunk compressing means 3 automatically chooses a predetermined temporal amount of cohesive video signals comprising the respective key event 50, 51, 52 to generate a key video sequence 30, 31, 32 for the respective video chunk 20, 21, 22.

Therefore, it is guaranteed that a key video sequence 30, 31, 32 for a respective video chunk 20, 21, 22 comprises the corresponding key event 50, 51, 52 and thus identifies correctly the information comprised in the video signals of the respective video chunk 20, 21, 22.

In both the first and second mode of the video chunk compressing means 3 it is preferred that the second temporal amount of video signals comprised in each key video sequence 30, 31, 32 is between 3 and 30 seconds and preferably about 10 seconds when played back in real time.

Alternatively, as it is shown in FIG. 4, the temporal amount of video signals comprised in each key video sequence (KVS) 30, 31, 32 might be depending proportional on the temporal amount of video signals comprised in the corresponding video chunk 20, 21, 22.

As it is shown in FIGS. 3 and 4, the key video sequences 30, 31, 32 preferably are fast played back by the key video sequence playback means 4 in a time shorter than real time. Therefore, the temporal amount of video signals comprised in each fast played back key video sequence 30', 31', 32' is further reduced.

In the following, relations of important system parameters are further discussed by reference to FIG. 5.

Important system parameters are play back speed used by the key video sequence playback means 4, the first temporal amount of video signals comprised in each video chunk 20, 21, 22 and the second temporal amount of video signals comprised in each key video sequence 30, 31, 32.

Figure 5:
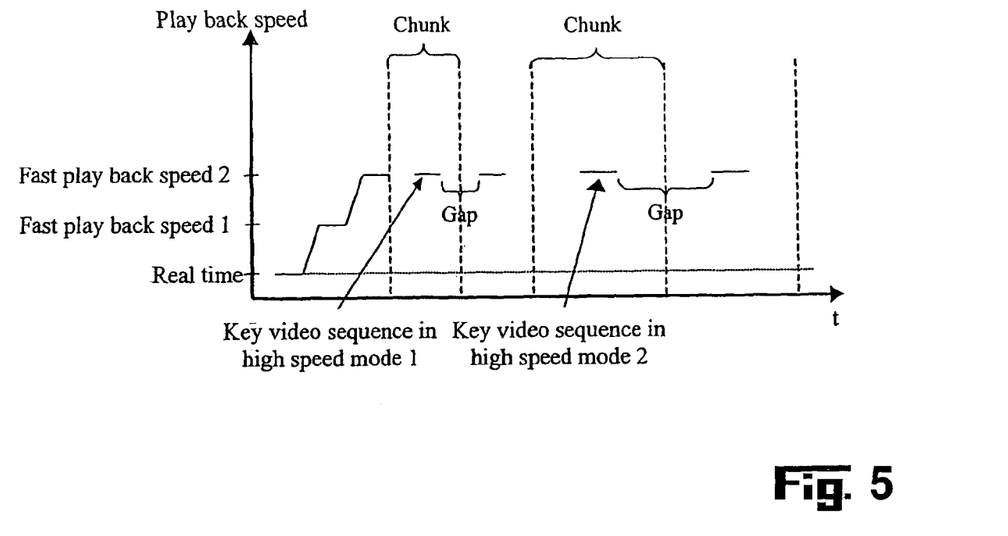
FIG. 5 illustrates the relation of system parameters used in the inventive video signal playback apparatus and method.

As it is shown in FIG. 5, during normal play back and fast play back the information comprised in the video signal basically is displayed continuously (and thus without gaps).

When play back of key video sequences is performed, there is a gap of left out information comprised in the video signal.

The above system parameters manipulate both the size of the second temporal amount of video signals comprised in the key video sequences and the size of gaps between subsequent key video sequences.

The second temporal amount of video signals comprised in the key video sequences influences the perception of the displayed information when key video sequences are played back.

If the second temporal amount of video signals comprised in the key video sequences is large the key video sequences are very well perceptible. On the other hand, the gaps between subsequent key video sequences have to be increased if the total amount of time which is necessary to scan the video signal is to be maintained constant. Thus, the risk of loss of information increases (high speed mode 2).

On the other hand, if the second temporal amount of video signals comprised in the key video sequences is small the playback of the key video sequences gets fragmented. Otherwise, the risk of loosing information decreases since the key video sequences can be widely spread over the video signal while keeping the amount of time which is necessary to scan the video signal constant (high speed mode 1).

In consequence, the second temporal amount of video signals comprised in the key video sequences is an important factor for the effectiveness of the inventive video signal playback apparatus 1.

Key video sequences can be played in real time (normal play back speed) or in a time shorter than real time (fast-forward mode).

Only a small part of each video chunk can be packed into the respective key video sequence if the play back speed is real time and thus low. Consequently, the gaps between subsequent key video sequences increase. On the other hand, key video sequences played back in real time are easy to understand.

Otherwise, if the play back speed is shorter than real time, larger parts of each video chunk can be put into a key video sequence. Thus, the gaps between subsequent key video sequences get smaller but the key video sequences become difficult to understand.

Figure 10:
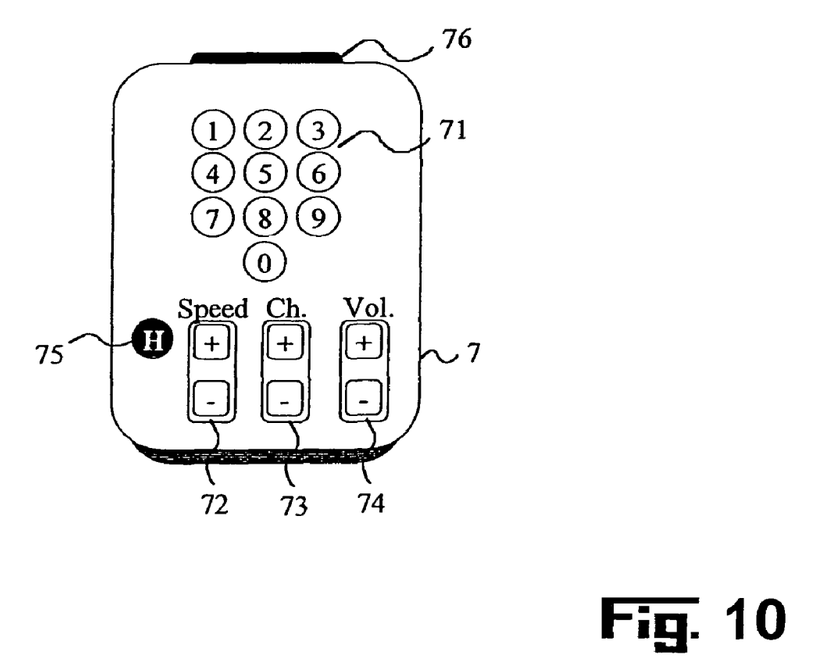
FIG. 10 shows a user interface for the inventive video signal playback apparatus.

The operation of the key video sequence playback means 4, the video signal chunking means 2 and the video chunk compressing means 3 are controlled by the user interface 7 which is shown in more detail in FIG. 10.

The user interface 7 comprises numeric buttons 71 for direct input of a video channel, a playback speed or a volume value. Furthermore, the user interface 7 comprises speed control buttons 72 to increase/reduce the play back speed of the key video sequence playback means 4. Moreover, the user interface 7 comprises channel selection means 73 and volume adjusting means 74.

In the vicinity of the speed control buttons 72 a high speed mode button 75 is provided to start/stop play back of key video sequences 30, 31, 32 by the key video sequence playback means 4.

In the embodiment shown in FIG. 10, the user interface 7 is connected to the key video sequence playback means 4, the video signal chunking means 2 and the video chunk compressing means 3 via an infrared connection means 76. Alternatively, the user interface 7 may be connected e.g. by wire to the key video sequence playback means 4, the video chunking means 2 and the video chunk compressing means 3.

The user interface 7 allows a manual control of the video signal chunking means 2 by defining the first temporal amount of video signals comprised in each video chunk 20, 21, 22 by using the numeric buttons 71. Moreover, the user interface 7 allows a manual control of the video chunk compressing means 3 by defining the second temporal amount of video signals comprised in each key video sequence 30, 31, 32 by using the numeric buttons 71.

Thus, the user interface 7 additionally allows a manual adjustment of the video chunk compressing means 2 to vary the second temporal amount of video signals comprised in each key video sequence 30, 31, 32 and thus the rate of compression performed by the video chunk compressing means 2.

In this respect it is preferred that the video signal playback apparatus 1 displays control information to the user by using the display means 9.

Preferably, said user interface 7 allows control of a play back operation by adjustment of the video chunk compressing means 2 before and/or during playback operation. In consequence, the user interactively influences play back the operation.

Furthermore, play back of key video sequences 30, 31, 32 automatically is initiated by the key video sequence playback means 4 when the video signals are fast played back in a time shorter than a predetermined fraction of real time wherein said fraction of real time is depending on an input of a user via the user interface 7.

This is further explained by reference to FIG. 7.

By using the speed control buttons 72 of the user interface 7 a user might increase the play back speed of the key video sequence playback means 4.

At a certain speed referred to as "trigger high speed mode", the playback speed will become to fast for the physical capabilities of a user.

In this instant the user will decide to press the high speed mode button 75 and initiate play back of key video sequences 30, 31, 32 by the key video sequence playback means 4.

The play back speed used when the high speed mode button 75 was pressed is stored by the user interface 7. The next time said play back speed is reached, play back of key video sequences 30, 31, 32 automatically is initiated by the user interface 7.

Play back of key video sequences 30, 31, 32 can be terminated at any instant by pressing the high speed mode button 75 once again. In this case, play back of the video signals by using the play back speed used when play back of key video sequences 30, 31, 32 was initiated is resumed. As said before, said play back speed is stored by the user interface 7 when the high speed mode button 75 is pressed to initiate play back of key video sequences 30, 31, 32.

The user might request to further enhance scanning speed by playing back the key video sequences 30, 31, 32 in a time shorter than real time.

When the user decides to reduce the play back speed of the key video sequences 30, 31, 32 again, the play back speed of the key video sequences 30, 31, 32 firstly will be reduced to real time.

Only if the scanning speed is to be further reduced, the play back of key video sequences 30, 31, 32 is terminated and fast play back of the video signals is initiated again ("Return to Fast-Forward").

Figure 7:
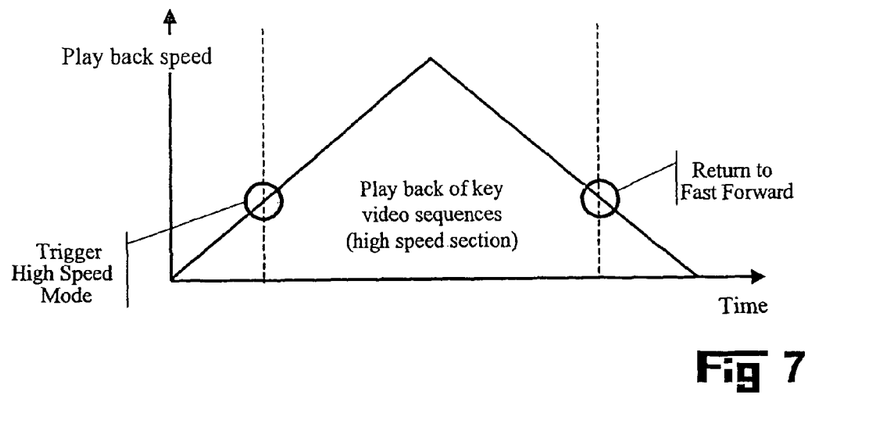
FIG. 7 schematically illustrates a preferred play back control mode of the inventive video signal playback apparatus.

In FIG. 7, a linear progression of the play back speed is shown. Thus, the difference between two successive play back speeds is equidistant. The advantage of this method is that it is more "natural" and "understandable" for a user.

According to a preferred embodiment of the present invention, by using the numeric buttons 71 the user interface 7 further allows a manual input of an amount of time envisaged for playing back said key video sequences 30, 31, 32 by said key video sequence playback means 4.

By using control means the inventive video signal playback apparatus automatically controls the first temporal amount of video signals 10 comprised in each video chunk 20, 21, 22 and the second temporal amount of video signals comprised in each key video sequence 30, 31, 32 based on the actual speed used by the key video sequence playback means 4 for playing back the key video sequences 30, 31, 32 in a way that the amount of time for playing back said key video sequences 30, 31, 32 which is requested by the user is met.

In the present embodiment said control means are included in the user interface 7. It is well understood that said control means alternatively might be included in the video sequence playback means 4, the video signal chunking means 2 or the video chunk compressing means 3. Further alternatively, a separate microcomputer might be provided to realise the control means.

Thus, once a requested duration of a preview (amount of time for playing back said key video sequences 30, 31, 32) is defined by a user by using the user interface 7, the control means automatically compresses the input video signal 10 by using the video signal chunking means 2 and the video chunk compressing means 3 in a way that the desired duration of the preview is met. This duration interactively might be influenced by the user either by amending the desired duration of the preview or by changing the speed used by the key video sequence playback means 4 for playing back the key video sequences 30, 31, 32.

Thus, the actual play back speed used by the key video sequence playback means 4 (which can be chosen by a user by using the user interface 7) preferably is used by the control means to calculate a suitable first temporal amount of video signals comprised in each video chunk 20, 21, 22 and a suitable second temporal amount of video signals comprised in each key video sequence 30, 31, 32 to control the video signal chunking means 2 and the video chunk compressing means 3.

It is preferred that the control means further are adapted to store the last play back speed used by the key video sequence playback means 4. In case no play back is actually performed by the key video sequence playback means 4 this stored play back speed is used by the control means to calculate both the suitable first temporal amount of video signals comprised in each video chunk 20, 21, 22 and the suitable second temporal amount of video signals comprised in each key video sequence 30, 31, 32.

In the above preferred embodiment, both the video signal chunking means 2 and the video chunk compressing means 3 are controlled by the control means to meet the desired amount of time for playing back said key video sequences 30, 31, 32. It is well understood that alternatively either the video signal chunking means 2 or the video chunk compressing means 3 might be controlled by the control means.

Summarising, the user interface 7 allows an interactive control of the inventive video signal playback apparatus by a user.

Figure 8:
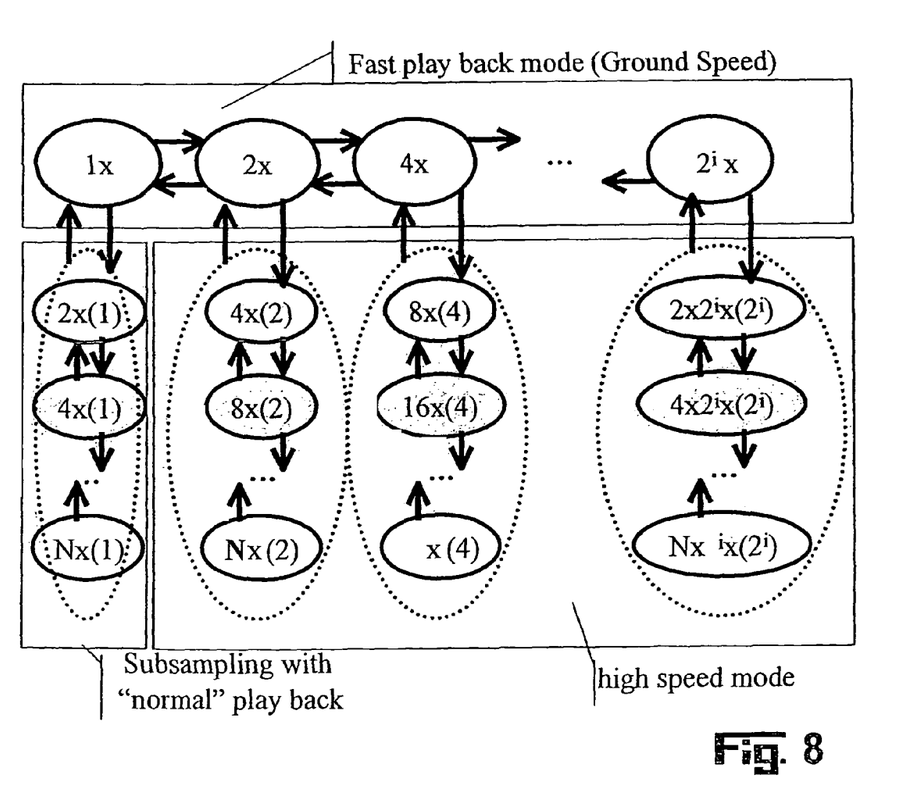
FIG. 8 schematically explains different play back modes of the inventive video signal playback apparatus.

Alternatively, the different speeds of vision might be increased exponentially as it is shown in FIG. 8. This method is more effective and less time consuming than a linear progression.

In the above example, the key video sequences 30, 31, 32 have been played back in a time shorter than real time to further increase the scanning speed.

Figure 6:
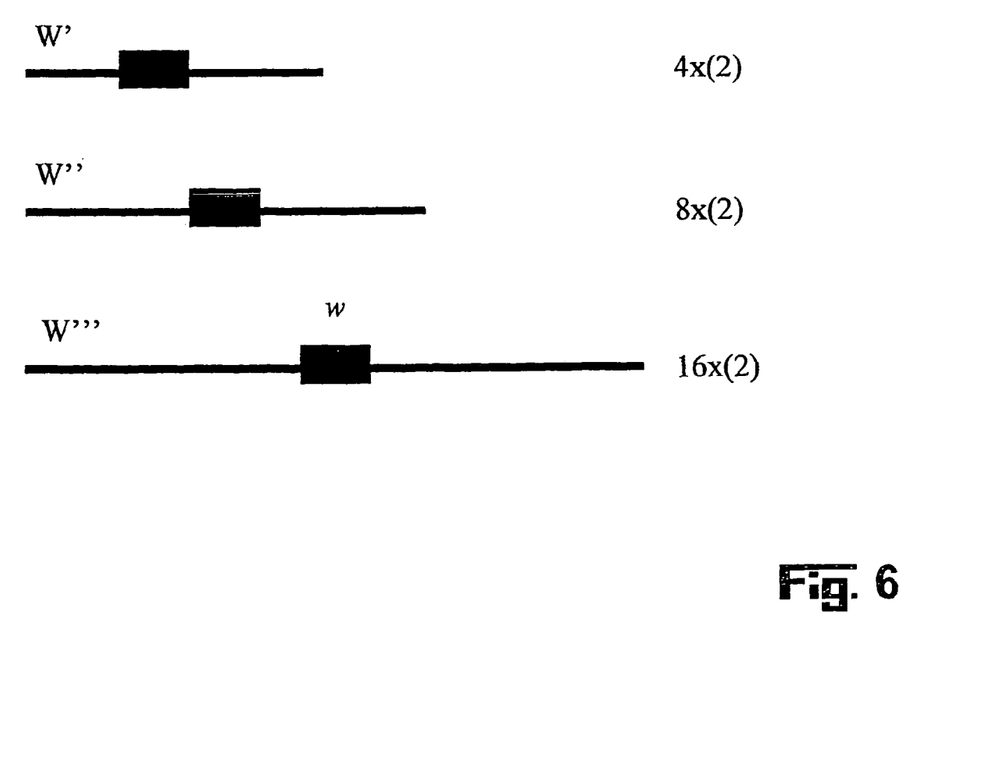
FIG. 6 schematically shows the influence of playback speed on system parameters.

Another possibility to further enhance scanning speed during play back of key video sequences will be discussed in the following by reference to FIG. 6.

A change of the scanning speed during play back of key video sequences can be implemented by varying the first temporal amount W', W'', W''' of video signals comprised in the video chunks and/or the second temporal amount w of video signals comprised in the key video sequences.

In the following, a specific case where the second temporal amount w of video signals comprised in the key video sequences is determined a priori (e.g. 5 seconds) and the first temporal amount W', W'', W''' of video signals comprised in the video chunks is calculated proportionally to the second temporal amount w is discussed in detail.

If the scanning speed is increased while keeping the play back speed of the key video sequences constant, the first temporal amount W', W'', W''' of video signals comprised in the video chunks that have to be compressed gets larger.

This increased first temporal amount W', W'', W''' of video signals has to be compressed to the same second temporal amount w of video signals comprised in the key video sequences. As a result, the size of the gaps between the key video sequences necessarily gets larger. Therefore, the risk of loosing information gets proportionally higher.

Although the advantages of the use of both a content detection means 5 and a key event detection means 6 have been discussed in the above embodiment, it can even be very profitable to avoid use of both the content detection means 5 and the key event detection means 6 for the following reasons:

Firstly, both content detection means 5 and event detection means 6 require a rather complex analysis of the input video signal which significantly increases costs of the inventive apparatus.

Secondly, provision of content detection means 5 and event detection means 6 reduces objectivity of the inventive video signal playback apparatus since an analysis and in consequence weighting of the input video signal is performed. In consequence video signals comprising a e.g. boring movie might seem to be interesting to a user when playing back key events of the movie, only. Thus, the summary of video signals generated by the inventive video signal playback apparatus when using both content detection means 5 and event detection means 6 might not be suitable to correctly characterise the video signals. This might result in a manipulation of a user when the user wants to decide whether a video signal input to the inventive video signal playback apparatus is of interest for him.

Therefore, it might be preferred to avoid use of the content detection means 5 and to perform partitioning of a video signal by using the video signal chunking means in a "mechanical" way without performing analysis of the input video signals by using a predefined rule (e.g. predefined amount of video signals to be comprised in each video chunk), only.

In consequence, the video chunks will comprise both boring and interesting parts of e.g. a movie comprised in the video signals.

Similarly, it might be preferred to avoid use of the key event detection means 6 and to temporarily compress the video signals comprised in each video chunk in a more "mechanical" way by using a predefined rule (e.g. by choosing a section of video signals in the beginning or the middle or the end of each video chunk) without performing analysis of the video signals comprised in each video chunk to generate key video sequences corresponding to the respective video chunks.

In consequence, the key video sequences will comprise both boring and interesting parts of e.g. a movie comprised in the video signals. In consequence a user can decide by himself whether a video signal is of interest or not in a more objective way since parts of video signals which are of less significance are not "hidden" by the inventive video signal playback apparatus.

Thus, by avoiding both content detection means 5 and key event detection means 6 a manipulation of a user by the inventive video signal playback apparatus is averted since no analysis and in consequence no weighting of the input video signal is performed.

Summarising, the inventive video signal playback apparatus preferably comprises at least video signal chunking means for dividing (partitioning) a video signal (video stream) into video chunks (video sub segments), video chunk compressing means for compressing the video signals comprised in each video chunk to generate a key video sequence representing the respective chunk and key video sequence playback means, wherein the temporal amount of video signals comprised in the key video sequence is smaller than the temporal amount of video signals comprised in the respective video chunk.

The preferably is adapted to select/define a temporal amount W for determining the amount of video signals to be comprised in each video chunk (the law for the determination of the temporal amount W preferably is depending on the play back speed chosen by a user).

The video chunk compressing means preferably extracts a sub-amount of video signals comprised in each video chunk to generate a corresponding key video sequence. Further compression can be performed by the key video signal playback means by increasing the play back speed when playing back said key video sequences.

Thus, compression of the input video signal preferably is performed by both extracting a sub-amount of video signals from each video chunk and by fast playback (e.g. 2×, 4×, 8× normal speed) of said extracted sub-amount of video signals.

Figure 2:
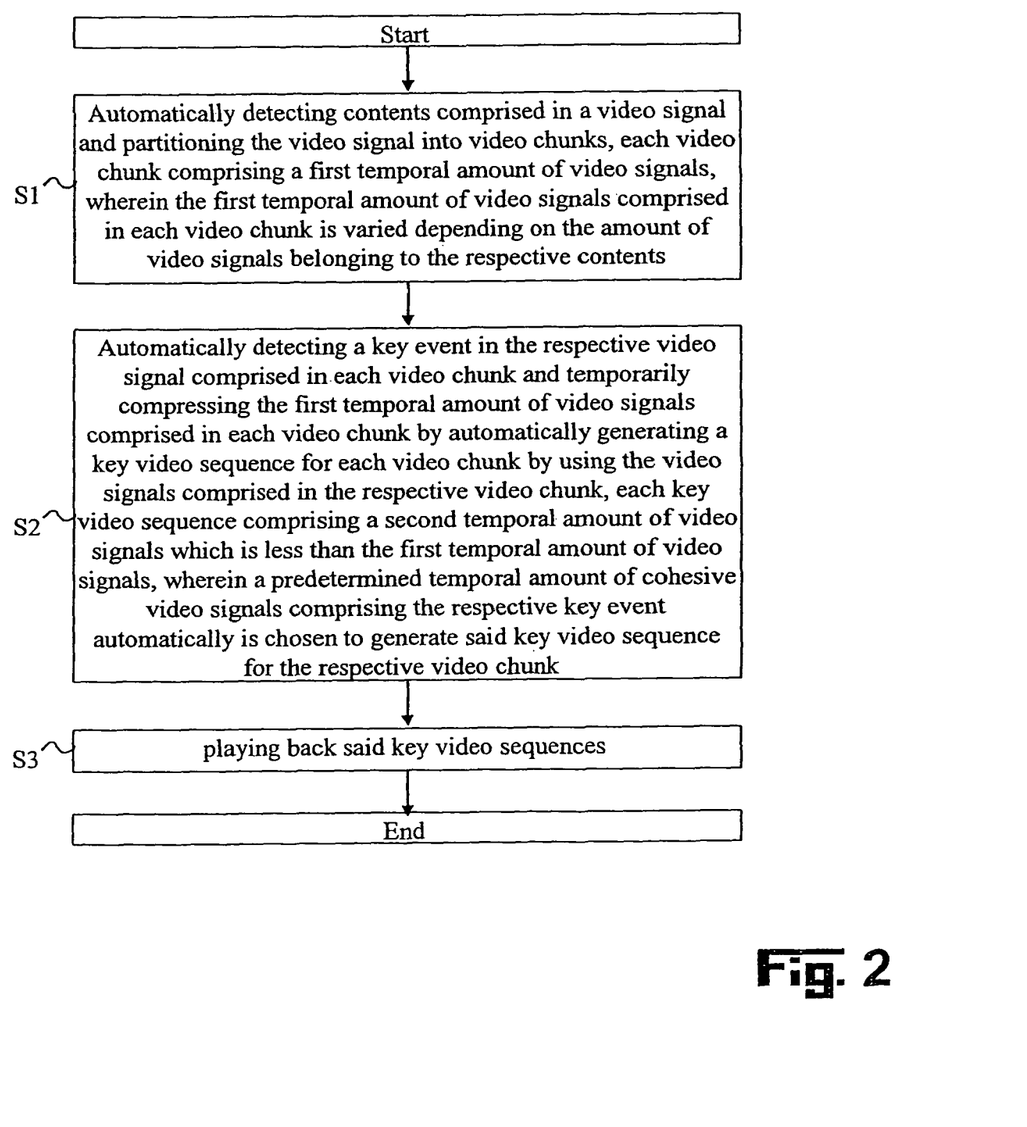
FIG. 2 shows a flow diagram of a preferred embodiment of the inventive method for playing back a video signal.

FIG. 2 shows a flow diagram of a preferred embodiment of the inventive method for play back a video signal.

In a first step S1 contents 40, 41, 42 comprised in the video signal 10 automatically are detected and the video signal 10 automatically is partitioned into video chunks 20, 21, 22, wherein a first temporal amount of video signals comprised in each video chunk 20, 21, 22 is varied depending on the amount of video signals belonging to the respective contents 40, 41, 42. Thus, each video chunk 20, 21, 22 comprises a first temporal amount of video signals which is a subset of the total temporal amount of video signals 10.

In a next step S2 a key event 50, 51, 52 automatically is detected in the respective video signal comprised in each video chunk 20, 21, 22, and the first temporal amount of video signals comprised in each video chunk 20, 21, 22 is temporally compressed by automatically generating a key video sequence 30, 31, 32 for each video chunk 20, 21, 22 by using the video signals comprised in the respective video chunk 20, 21, 22.

Said key video sequence 30, 31, 32 is generated by automatically choosing a predetermined temporal amount of cohesive video signals comprised in the respective video chunk 20, 21, 22, wherein the predetermined temporal amount is chosen in a way to comprise the respective key event 50, 51, 52.

Thus, each key video sequence 30, 31, 32 comprises a second temporal amount of video signals which is less than the first temporal amount of video signals comprised in the respective video chunk 20, 21, 22, wherein said second temporal amount of video signals comprises the respective key event 50, 51, 52.

In a last step S3, the key video sequences 30, 31, 32 are played back. Said play back can either be performed in real time or in a time shorter than real time. It has to be emphasised that play back of said key video sequences 30, 31, 32 is performed in one block without any gaps between said key video sequences 30, 31, 32.

According to an alternative embodiment which does not require detection of contents 40, 41, 42 comprised in the video signal 10, the first temporal amount of video signals comprised in each video chunk 20, 21, 22 is kept constant.

Further alternatively, the first temporal amount of video signals comprised in each video chunk 20, 21, 22 can be varied depending on a rate of temporal compression achieved during the method step S2 of temporally compressing the first temporal amount of video signals comprised in each video chunk 20, 21, 22 to keep the second temporal amount of video signals comprised in each key video sequence 30, 31, 32 constant. This alternative does not require detection of contents 40, 41, 42 comprised in the video signal 10, either.

In a further alternative embodiment which does not require the detection of a key event in the respective video signal comprised in each video chunk 20, 21, 22, the key video sequence 30, 31, 32 for each video chunk 20, 21, 22 is generated automatically by choosing a section of the video signals comprised in the respective video chunk 20, 21, 22. Preferably, a predetermined amount of cohesive video signals in the beginning and/or the middle and/or the end of the video signals comprised in each video chunk 20, 21, 22 is chosen to generate said key video sequence 30, 31, 32 for the respective video chunk 20, 21, 22.

Moreover it is preferred that the method additionally comprises the steps of detecting speed of playback of video signals and initiating automatically playback of key video sequences 30, 31, 32 when the video signals 10 are fast played back in a time shorter than a predetermined fraction of real time.

Figure 9:
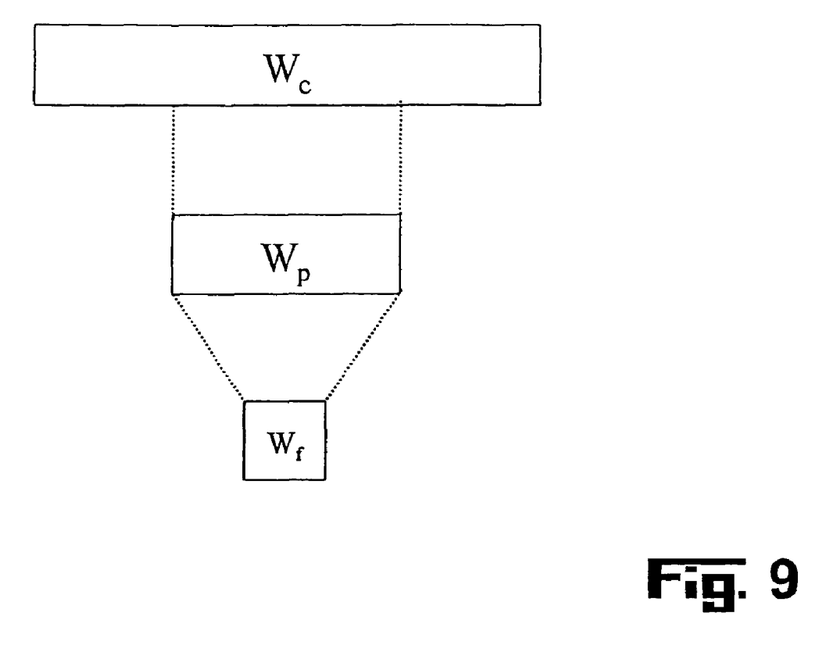
FIG. 9 schematically shows the temporal amount of video signals comprised in a video chunk, a corresponding key video sequence and said key video sequence when played back in a time shorter than real time.

In the following, an implementation of the inventive method by using a pseudo-code is proposed by reference to FIG. 9.

Input:
    V video signal to be previewed;
    $v_{ff}$ play back speed for playing back key video sequences $W_p(n)$ relative to real time play back speed (1-times, 2-times, 4-times, 8-times, . . . , $2^i$-times); said speed might be controlled interactively by a user;
    $v_v(t)$ desired scanning speed relative to real time play back speed (2-times, 4-times, 8-times, . . . , $2^{i+1}$-times); said speed might be controlled interactively by a user at time t;
    $w_f$ temporal amount of video signals comprised in the key video sequence $W_v(n)$ when played back at the play back speed $v_{ff}$;

Additional Parameter:
 $W_c(n)$ video chunk comprising a temporal amount $w_c(n)$ of video signals;
 $w_p$ temporal amount of video signals comprised in the key video sequence $W_v(n)$;
 n index;
Output:
succession of fast played back key video sequences
Pseudo-Code:

```
begin
n = 0
while not terminated{
    choose video chunk W_c(n) comprising a temporal amount of video
    signals
    w_c(n) = w_f * v_v(t);
    select key video sequence W_p(n) with size w_p = w_f * v_ff;
    play back key video sequence W_p(n) in v_ff-times real time speed
    n = n + 1}
end
```

Thus, the inventive method easily can be solved by a software product comprising a series of state elements which are adapted to be processed by a data processing means of a terminal such, that a method may be executed thereon.

Said terminal might be a personal computer or video recording/reproducing apparatus or a set-top-box of a video on demand system, for example.

Summarising, the inventive method for playing back a video signal preferably comprises a first step of dividing (partitioning) a video signal (video stream) in chunks (video sub segments) and a second step of compressing the video signals comprised in each chunk to generate a key video sequence representing the respective chunk.

The division (partitioning) of the video signal into video chunk preferably is performed by selecting a temporal amount W for determining the amount of video signals comprised in each chunk (the law for the determination of the temporal amount W preferably is linked to the play back speed chosen by a user).

The compression of each chunk preferably is performed by extracting a sub-amount of video signals comprised in each video chunk to generate a key video sequence. Further compression is performed by increasing the play back speed when playing back said key video sequence. Thus, preferably compression is performed by both extracting a sub-amount of video signals from each chunk and by fast playback of said extracted sub-amount of video signals.

To enhance clarity of FIG. 1, supplementary means as power supply, buffer memories etc. are not shown.

In the one embodiment of the present invention shown in FIG. 1, separate microprocessors are used for the key video sequence playback means 4, the video signal chunking means 2 and the video chunk compressing means 3.

Alternatively, one single microcomputer might be used to incorporate the key video sequence playback means, the video signal chunking means and the video chunk compressing means.

Furthermore, in the above embodiment the content detection means and the key event detection means are implemented in the video signal chunking means and the video chunk compressing means, respectively. Alternatively, separated microcomputers might be used for the content detection means and the key event detection means. Further alternatively, said content detection means and the key event detection means might be realised by separated apparatus which are connectable to the inventive video signal playback apparatus.

Preferably, the inventive video signal playback apparatus is integrated into a video recording/reproducing apparatus.

Alternatively, the inventive video signal playback apparatus might be realised by use of a conventional personal computer or workstation.

Further alternatively, the inventive signal playback apparatus might be a part of a video-on-demand system, e.g. a set top box.

Although the video chunks described by reference to FIG. 5 have been adjacent to one another, it is obvious that the video chunks alternatively might be not-adjacent and thus separated e.g. by a predefined or variable amount of video signals (and thus playback-time).

Thus, the video signal playback apparatus and method offers a flexible solution to reduce the amount of time necessary to visually scan through video information comprised in a video signal without overstraining the physical capabilities of a user. Furthermore, the loss of information comprised in the video signal is kept small.

Therefore, a user is enabled in a flexible way to judge if a video signal comprises interesting contents.

The invention claimed is:

1. A method for playing back a video signal, comprising:
partitioning a video signal to be played into video chunks, each video chunk including a first temporal amount of video signals;
compressing in time the first temporal amount of video signals included in each video chunk, said compressing step including
 automatically generating exactly one key video sequence for each video chunk by using the video signals included in the respective video chunk, each key video sequence including a second temporal amount of video signals which is less than the first temporal amount of video signals;
playing back the key video sequences consecutively without gaps between the key video sequences;
detecting a speed of play back of video signals; and
automatically initiating play back of key video sequences when the detected speed indicates the video signals are played back in a time shorter than a predetermined fraction of real time.

2. A video signal playback apparatus, comprising:
video signal chunking means for partitioning a video signal provided to the video signal playback apparatus into video chunks, each video chunk comprising a first temporal amount of video signals;
video chunk compressing means for performing a time compression of the first temporal amount of video signals comprised in each video chunk, wherein the video chunk compressing means compresses in time the first temporal amount of video signals included in each video chunk by automatically generating exactly one key video sequence for each video chunk, each key video sequence including a second temporal amount of video signals which is less than the first temporal amount of video signals;
key video sequence playback means for playing back the video signal and the key video sequences generated by the video chunk compressing means at a playback speed, wherein a third temporal amount is given by a playback duration of a key video sequence played back at the play back speed and a scanning speed is given by the ratio of the first temporal amount to the third temporal amount; and a user interface allowing control of the scanning speed, wherein when the scanning speed is increased from below a threshold speed to above the threshold speed, the key video sequence playback means plays back the video signal continuously when the scanning speed is equal to or below the threshold speed, and the key video sequence playback means plays back the key video sequences when the scanning speed is higher than the threshold speed.

3. A video signal playback apparatus according to claim 2, wherein the key video sequence playback means plays back the video signal with a play back speed equal to the scanning speed and plays back key video sequences with a play back speed equal to the threshold speed.

4. A method for playing back a video signal, comprising:

partitioning a video signal to be played into video chunks, each video chunk including a first temporal amount of video signals;

compressing in time the first temporal amount of video signals included in each video chunk, said compressing step including automatically generating exactly one key video sequence for each video chunk by using the video signals included in the respective video chunk, each key video sequence including a second temporal amount of video signals which is less than the first temporal amount of video signals;

playing back the video signal and the key video sequences at a playback speed, wherein a third temporal amount is given by a playback duration of a key video sequence played back at the playback speed and a scanning speed is given by the ratio of the first temporal amount and the third temporal amount; and varying the scanning speed from below a threshold speed to above the threshold speed, wherein the video signal is played back continuously in the step of playing back when the scanning speed is equal or below a threshold speed, and the key video sequences are played back in the step of playing back when the scanning speed is above the threshold speed.

5. A video signal playback method according to claim 4, wherein the video signal is played back with a play back speed equal to the scanning speed and the key video sequences are played back with a play back speed equal to the threshold speed.

\* \* \* \* \*